(12) United States Patent
Herring

(10) Patent No.: US 10,413,888 B2
(45) Date of Patent: Sep. 17, 2019

(54) IRON DOPED TITANIUM DIOXIDE NANOCRYSTALS AND THEIR USE AS PHOTOCATALYSTS

(71) Applicant: RH-IMAGING SYSTEMS INC., Victoria (CA)

(72) Inventor: Rodney Herring, Victoria (CA)

(73) Assignee: RH-IMAGING SYSTEMS, INC. (CA)

( * ) Notice: Subject to any disclaimer, the term of this patent is extended or adjusted under 35 U.S.C. 154(b) by 0 days.

(21) Appl. No.: 16/339,321

(22) PCT Filed: Sep. 29, 2017

(86) PCT No.: PCT/CA2017/000217
§ 371 (c)(1),
(2) Date: Apr. 3, 2019

(87) PCT Pub. No.: WO2018/064747
PCT Pub. Date: Apr. 12, 2018

(65) Prior Publication Data
US 2019/0240644 A1    Aug. 8, 2019

Related U.S. Application Data

(60) Provisional application No. 62/404,006, filed on Oct. 4, 2016.

(51) Int. Cl.
| | | |
|---|---|---|
| *B01J 23/745* | (2006.01) | |
| *B01J 35/00* | (2006.01) | |
| *B01J 37/02* | (2006.01) | |
| *B01J 37/06* | (2006.01) | |
| *C02F 1/32* | (2006.01) | |
| *C02F 1/72* | (2006.01) | |
| *C02F 101/30* | (2006.01) | |
| *C02F 101/16* | (2006.01) | |

(52) U.S. Cl.
CPC ........... *B01J 23/745* (2013.01); *B01J 35/004* (2013.01); *B01J 35/0013* (2013.01);
(Continued)

(58) Field of Classification Search
CPC .... B01J 23/745; B01J 35/0013; B01J 35/004; B01J 37/0201; B01J 37/0236; B01J 37/06; C02F 1/32; C02F 1/725; C02F 2101/16; C02F 2101/30; C02F 2303/04; C02F 2305/10
See application file for complete search history.

(56) References Cited

U.S. PATENT DOCUMENTS

| | | |
|---|---|---|
| 2005/0181937 A1 | 8/2005 | Karvinen |
| 2016/0236174 A1 | 8/2016 | Lowry |

FOREIGN PATENT DOCUMENTS

CN         105709687         6/2016

OTHER PUBLICATIONS

International Search Report and Written Opinion dated Jan. 9, 2018, International Patent Application No. PCT/CA2017000217, 10 Pages.
(Continued)

*Primary Examiner* — Lucas A Stelling
(74) *Attorney, Agent, or Firm* — Baumgartner Patent Law; Marc Baumgartner

(57) ABSTRACT

A method of making a visible light photo-catalyst is provided, the method comprising doping a titanium dioxide nanocrystal with iron to provide an iron-doped nanocrystal, washing the iron-doped nanocrystal with an acid to produce an acid-washed iron-doped titanium dioxide nanocrystal and rinsing the acid-washed iron-doped titanium dioxide nanocrystal to remove a residual of the acid, thereby providing a visible light photo-catalyst. The photo-catalyst is also provided, as are methods of using the photo-catalyst in remediation.

20 Claims, 15 Drawing Sheets

(52) U.S. Cl.
CPC ....... *B01J 37/0201* (2013.01); *B01J 37/0236* (2013.01); *B01J 37/06* (2013.01); *C02F 1/32* (2013.01); *C02F 1/725* (2013.01); C02F 2101/16 (2013.01); C02F 2101/30 (2013.01); C02F 2303/04 (2013.01); C02F 2305/10 (2013.01)

(56) References Cited

OTHER PUBLICATIONS

International Preliminary Report on Patentability dated Jan. 31, 2019, International Patent Application No. PCT/CA2017000217, 12 Pages.

Bajnóczi, É. G. et al., "The influence of the local structure of Fe(III) on the photocatalytic activity of doped $TiO_2$ photo-catalysts—An EXAFS, XPS and Mössbauer spectroscopic study", Applied Catalysis B: Environmental 2011, 103, 232-239.

Serpone et al., Spectroscopic, Photoconductivity, and Photocatalytic Studies of $TiO_2$ Colloids: Naked and with the Lattice Doped with $Cr^{3+}$, $Fe^{3+}$, and $V^{5+}$ Cations:, Langmuir 1994, 10, 643-652.

Choi et al., "The Role of Metal Ion Dopants in Quantum-Sized $TiO_2$: Correlation between Photoreactivity and Charge Carrier Recombination Dynamics", The Journal of Physical Chemistry 1994, 98, 13669-13679).

Zhou et al., "Preparation and photocatalytic activity of Fe-doped mesoporous titanium dioxide nanocrystalline photo-catalysts", Materials Chemistry and Physics 2005, 93, 159-163.

Kerkez-Kuyumcu et al., "A comparative study for removal of different dyes over $M/TiO_2$ (M = Cu, Ni, Co, Fe, Mn and Cr) photo-catalysts under visible light irradiation", Journal of Photochemistry and Photobiology A: Chemistry 2015, 311, 176-185.

US 10,413,888 B2

IRON DOPED TITANIUM DIOXIDE NANOCRYSTALS AND THEIR USE AS PHOTOCATALYSTS

CROSS REFERENCE TO RELATED APPLICATIONS

The present invention is filed under 35 U.S.C. § 371 as the U.S. National Phase of International Application No. PCT/CA2017/000217, filed Sep. 29, 2017, which designated the U.S. and claims the benefit of U.S. Provisional Application No. 62/404,006, filed on Oct. 4, 2016 and entitled "IRON DOPED TITANIUM DIOXIDE NANOCRYSTALS AND THEIR USE AS PHOTOCATALYSTS", each of which is hereby incorporated in its entirety including all tables, figures, and claims.

FIELD

The present technology relates to low iron oxide, iron doped titanium dioxide nanocrystals as photo-catalysts. More specifically, the technology is acid-washed iron doped titanium oxide visible light photo-catalysts.

BACKGROUND

Anatase titanium dioxide ($TiO_2$) has been widely studied during recent decades for photocatalytic applications such as water purification, water splitting and solar cells due to its low cost, high chemical stability and excellent charge transport ability. However, because of its large band gap energy (≈3.2 eV), it shows a poor photocatalytic activity by visible light requiring UV light activation. It has been shown that doping $TiO_2$ with transition metal ions can improve its photocatalytic activity under visible light irradiation. It is believed that the interaction of the 3d orbital of Ti and d orbital of the transition metal introduces an intra-band gap state causing a decrease in the band gap energy, which leads to a red shift (longer wavelengths) in absorption of the photon. Furthermore, metal dopants inhibit electron/hole recombination that enhances the photocatalytic activity, due to the effective separation of the charge carriers. The fast recombination of photo generated electrons and holes reduces the photo catalytic activity of $TiO_2$. Using metal dopants, electrons and/or holes can be trapped, leading to the increased life time of the charge carriers enhancing their time to reach the catalyst's surface for initiation of the photo catalytic reactions. It has been reported that among transition metals, $Fe^{3+}$ can inhibit electron/hole recombination the best by trapping the photo generated electrons and holes. Since the energy level of $Fe^{3+}/Fe^{4+}$ is above the valence band energy and $Fe^{3+}/Fe^{2+}$ is below the conduction band energy of $TiO_2$, $Fe^{3+}$ can react with either a hole or an electron forming $Fe^{4+}$ or $Fe^{2+}$ trap reducing the recombination of charge carriers. On the other hand, $Fe^{2+}$ and $Fe^{4+}$ are less stable than $Fe^{3+}$ based upon the crystal field theory involved with gaining or losing an electron, causing them to eventually revert back to the $Fe^{3+}$ state, which would release the electron and hole for their migration to the surface of the catalyst to initiate the photo catalytic reactions.

A previous report using XPS and atomic absorption spectroscopy indicated that the surface concentration of $Fe^{3+}$ is significantly higher than the bulk concentration (Bajnóczi, É. G.; Balázs, N.; Mogyorósi, K.; Sranko, D. F.; Pap, Z.; Ambrus, Z.; Canton, S. E.; Norén, K.; Kuzmann, E.; Vértes, A.; Homonnay, Z.; Oszkó, A.; Pálinkó, I.; Sipos, P., The influence of the local structure of Fe(III) on the photocatalytic activity of doped $TiO_2$ photo-catalysts—An EXAFS, XPS and Mössbauer spectroscopic study. Applied Catalysis B: Environmental 2011, 103, 232-239).

The role of $Fe^{3+}$ is still under debate; Serpone et al. (Spectroscopic, Photoconductivity, and Photocatalytic Studies of $TiO_2$ Colloids: Naked and with the Lattice Doped with $Cr^{3+}$, $Fe^{3+}$, and $V^{5+}$ Cations. Langmuir 1994, 10, 643-652) reported that iron increases the recombination of electrons and holes, which is detrimental to the photocatalytic activity, where they described that by increasing the amount of dopant, the photocatalytic activity decreased. On the other hand, Choi et al. (The Role of Metal Ion Dopants in Quantum-Sized $TiO_2$: Correlation between Photoreactivity and Charge Carrier Recombination Dynamics. The Journal of Physical Chemistry 1994, 98, 13669-13679) and Zhou et al. (Zhou, M.; Yu, J.; Cheng, B.; Yu, H., Preparation and photocatalytic activity of Fe-doped mesoporous titanium dioxide nanocrystalline photo-catalysts. Materials Chemistry and Physics 2005, 93, 159-163) suggested that adding iron ions as the dopant decreases electron/hole recombination and increases the photocatalytic activity. They concluded that $Fe^{3+}$ can trap both electrons and holes, which is favorable for photocatalytic efficiency. However, based upon the previous studies, the degradation efficiency of Fe-doped $TiO_2$ is low (7.8% and 5.5%) degradation of methyl orange within 5 and 3 hours of reaction time, respectively) under visible light illumination (Kerkez-Kuyumcu, Ö.; Kibar, E.; Dayioğlu, K.; Gedik, F.; Akin, A. N.; Özkara-Aydinoğlu, Ş., A comparative study for removal of different dyes over $M/TiO_2$ (M=Cu, Ni, Co, Fe, Mn and Cr) photo-catalysts under visible light irradiation. Journal of Photochemistry and Photobiology A: Chemistry 2015, 311, 176-185). Thus, doping with iron may or may not allow ultraviolet light to be replaced with visible light and if it can be, the efficiency of breakdown is extremely low.

What is needed is a method of increasing the photocatalytic activity of Fe-doped titanium dioxide. It would be advantageous if the method was low cost and easy to perform. It would be advantageous if the method provided a significantly better product. It would be of further advantage if the product was used in a method for cleaning of waste water and other contaminated aqueous solutions using visible light. More specifically, it would be advantageous if the product and method of use could be used to treat ammonia in waste water as there is no effective way to treat this ammonia. It would also be advantageous if the product and the method of use could be used to treat organics in waste water. The organics in waste water are now treated by biological means that are susceptible to infections, temperature, pH, etc. and poisoned by ammonia requiring the waste water to be diluted by fresh water or sea water that further impacts our environment. It would be of further advantage if the product and method could control, inhibit or eliminate microbial growth.

SUMMARY

The present technology provides an easy to perform, low cost method for increasing the photocatalytic activity of Fe-doped titanium dioxide. It also provides Fe-doped titanium dioxide having significantly higher photocatalytic activity. A product that can be used to treat organic waste in waste water using visible light is also provided. A product that can be used to control, inhibit or eliminate microbial growth is also provided.

In one embodiment, a method of synthesizing a visible light photo-catalyst is provided, the method comprising doping a titanium dioxide nanocrystal with iron to provide an iron-doped titanium dioxide nanocrystal, washing the iron-doped titanium dioxide nanocrystal with an acid having a pH of no higher than about 4 to produce an acid-washed iron-doped titanium dioxide nanocrystal and rinsing the acid-washed iron-doped titanium dioxide nanocrystal to remove a residual of the acid, thereby providing the visible light photo-catalyst.

In the method, the rinsing may be a water rinse.

In the method, the acid may have a pH of about 2.5 to about 3.5.

In the method, the acid may be hydrochloric acid.

In another embodiment, a method of making a low iron oxide visible light photo-catalyst is provided, the method comprising doping a titanium dioxide nanocrystal with iron to provide an iron-doped nanocrystal, washing the iron-doped nanocrystal with an acid having a pH no greater than about 4 to decrease or remove at least one iron oxide deposit to produce an acid washed iron-doped titanium dioxide nanocrystal and rinsing the acid washed iron-doped titanium dioxide nanocrystal to remove a residual of the acid, thereby providing the low iron oxide visible light photo-catalyst.

In the method, the iron doping of titanium dioxide may be conducted at a pH of about 2.5 to about 3.5.

In the method, the acid washing may be conducted at a pH of about 2.5 to about 3.5.

In the method, the acid may be hydrochloric acid.

In another embodiment, a visible light photo-catalyst for remediation of aqueous solutions comprising one or more of organic matter, at least one microbe, at least one organic compound and at least one organometallic compound is provided, the photo-catalyst comprising acid washed iron-doped titanium dioxide nanocrystals which have a low iron oxide content.

In another embodiment, a method of remediating an aqueous solution is provided, the aqueous solution including one or more of at least one organic compound, organic matter, microbial contamination or at least one organometallic compound, the method comprising: exposing the aqueous solution to a photo-catalyst, the photo-catalyst comprising acid washed iron doped titanium dioxide which has a reduced content of iron oxide; and exposing the photo-catalyst to light, thereby remediating the aqueous solution and producing an at least one remediation product.

In the method, the light may be visible light.

In the method, exposing may comprise mixing the photo-catalyst in the aqueous solution.

In the method, exposing may comprise flowing the aqueous solution over the photo-catalyst which is immobilized.

In the method, exposing may comprise flowing the aqueous solution through a tube in which the photo-catalyst is immobilized.

In the method, exposing may comprise retaining the aqueous solution in a containment structure upon which the photo-catalyst is immobilized.

In the method, the aqueous solution may include the microbial contamination, and remediating may reduce or eliminate microbial growth.

In the method, the microbial contamination may be a gram-positive or a gram-negative bacterial contamination.

In yet another embodiment, a method of remediating an aqueous solution is provided, the aqueous solution including ammonia, the method comprising: exposing the aqueous solution to a visible light photo-catalyst, the photo-catalyst comprising substantially iron oxide free, iron doped titanium dioxide; and exposing the photo-catalyst to light, thereby remediating the aqueous solution.

In the method, the light may be visible light.

In the method, the aqueous solution may further include an at least one organic compound.

In another embodiment, a combination for use in remediation of aqueous solutions is provided, the combination comprising: a visible light photo-catalyst, the photo-catalyst comprising acid washed iron-doped titanium dioxide which has a reduced content of iron oxide; and a substrate, the photo-catalyst attached to the substrate.

In the combination, the substrate may be glass.

In the combination, the glass may be a glass tube.

In the combination, the substrate may be aluminum.

In the combination, the aluminum may at least partially coat an inner surface of a waste water pipe.

The combination may further comprise a light source positioned to irradiate the photo-catalyst.

In the combination, the substrate may be an inner surface of a containment structure.

The combination may further comprise paint.

FIGURES

FIG. 1A-D show Transmission Electron Microscopy (TEM) images. FIG. 1A is TEM images of unwashed Fe0.5-$TiO_2$ particles; FIG. 1B is TEM images of acid washed Fe0.5-$TiO_2$ particles; FIG. 1C is High Resolution (HR)-TEM of unwashed Fe10-$TiO_2$ particles; and FIG. 1D is HR-TEM of acid washed Fe10-$TiO_2$ particles. The dashed outline around the areas in FIG. 1C depicts the amorphous deposit formed on the surface of the nanoparticles.

Figure 4A:
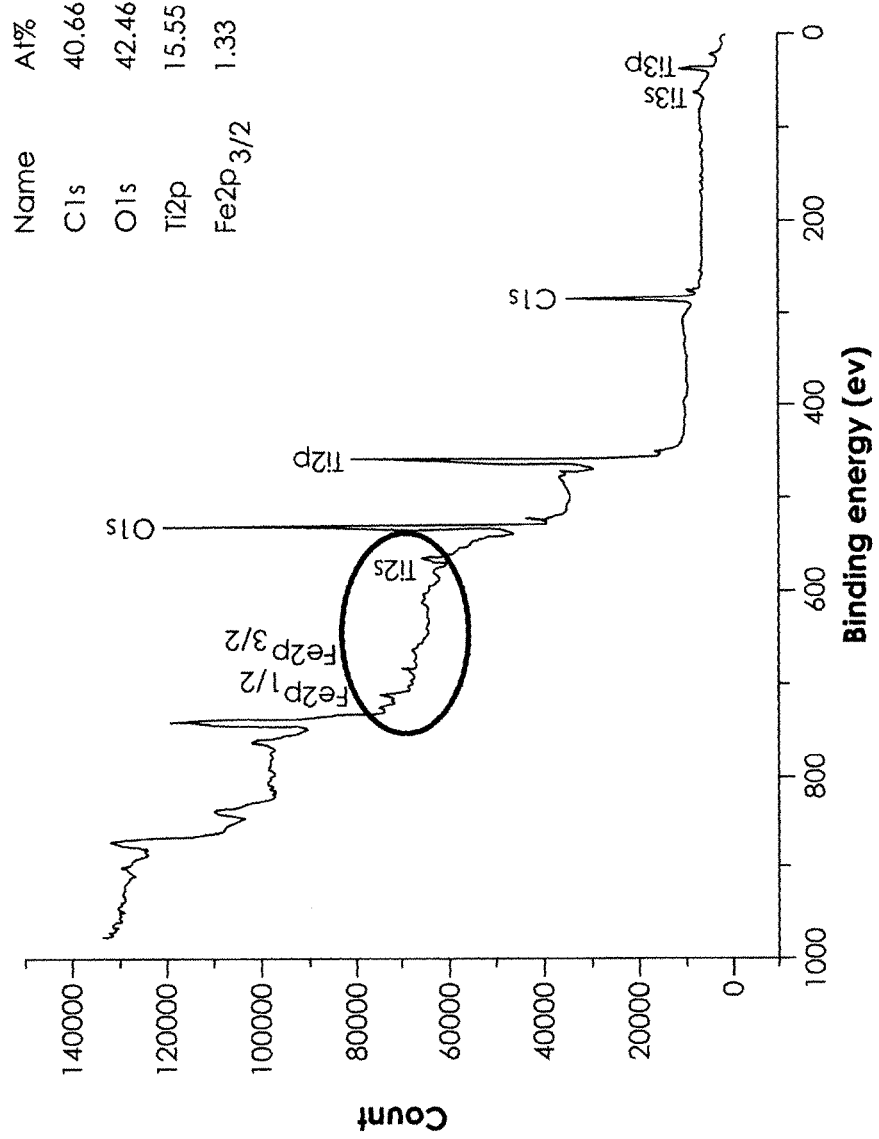
Figure 4B:
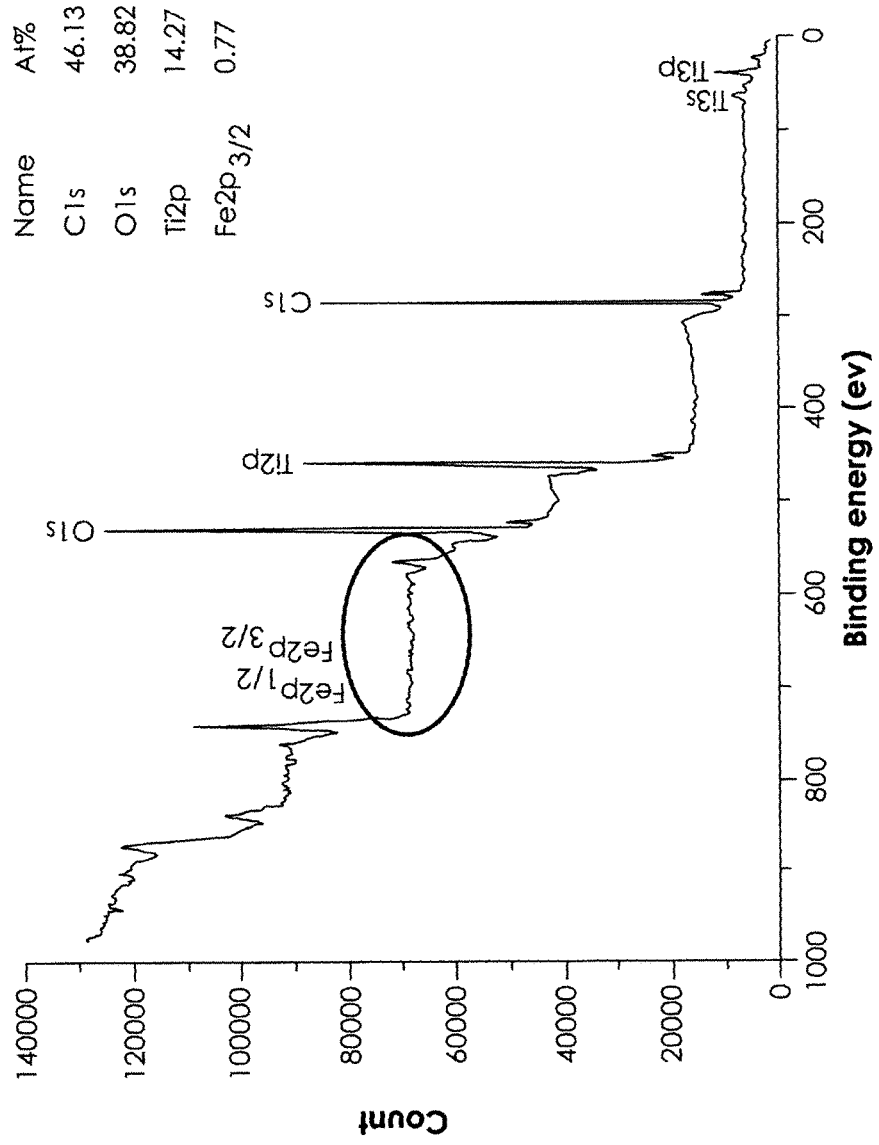
Figure 4C:
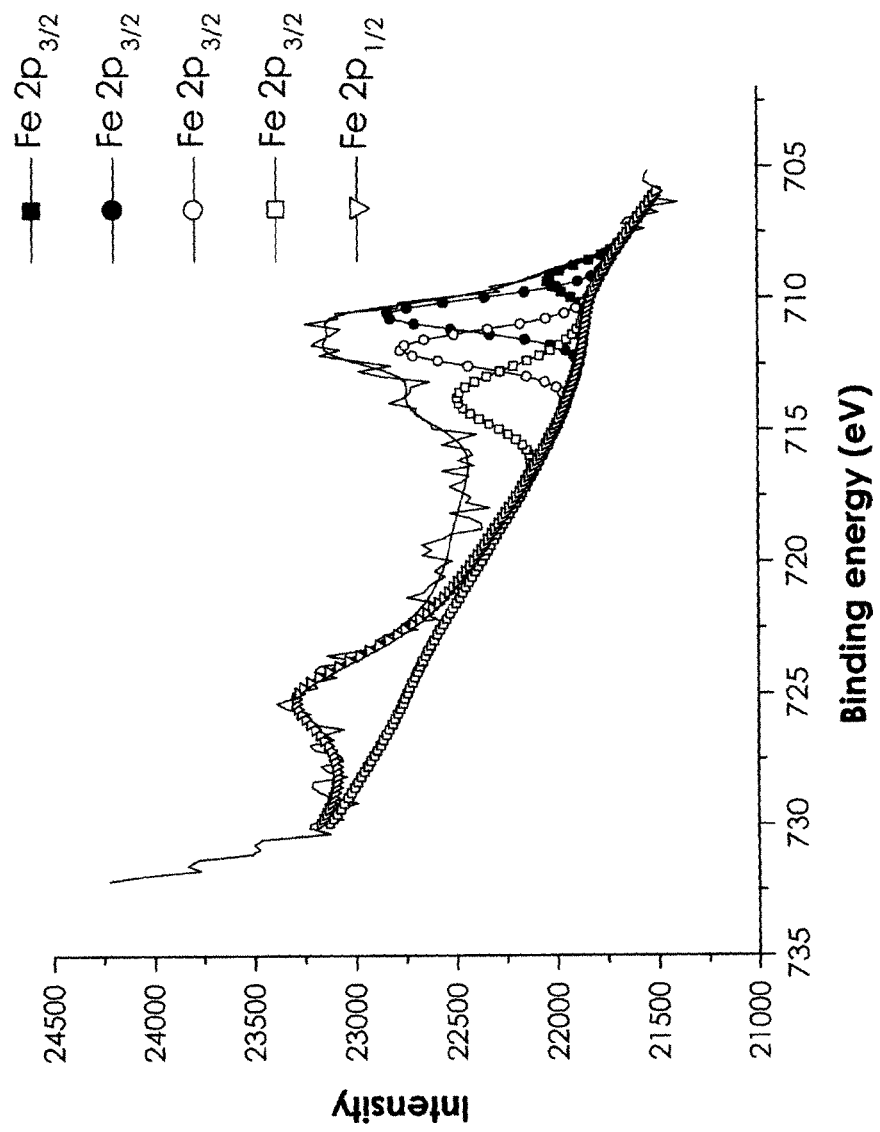
Figure 4D:
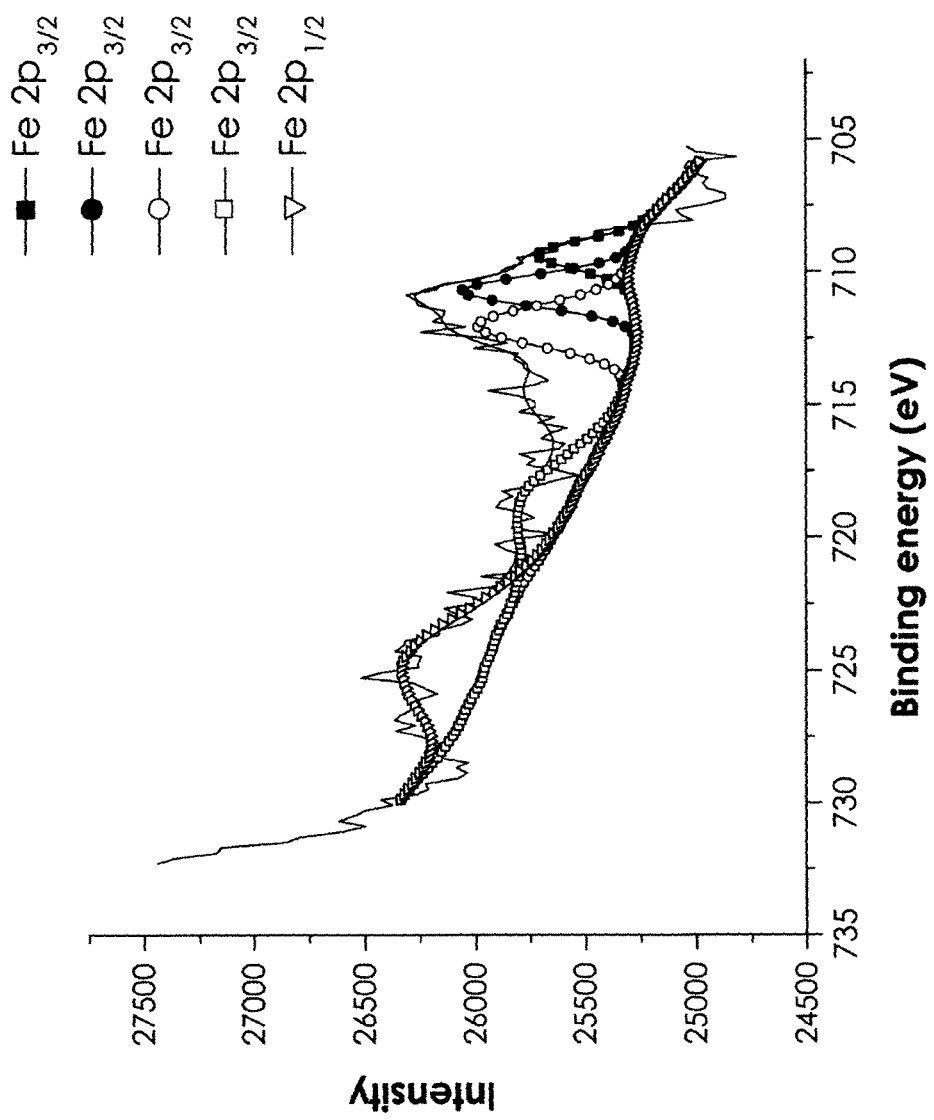
Figure 4E:
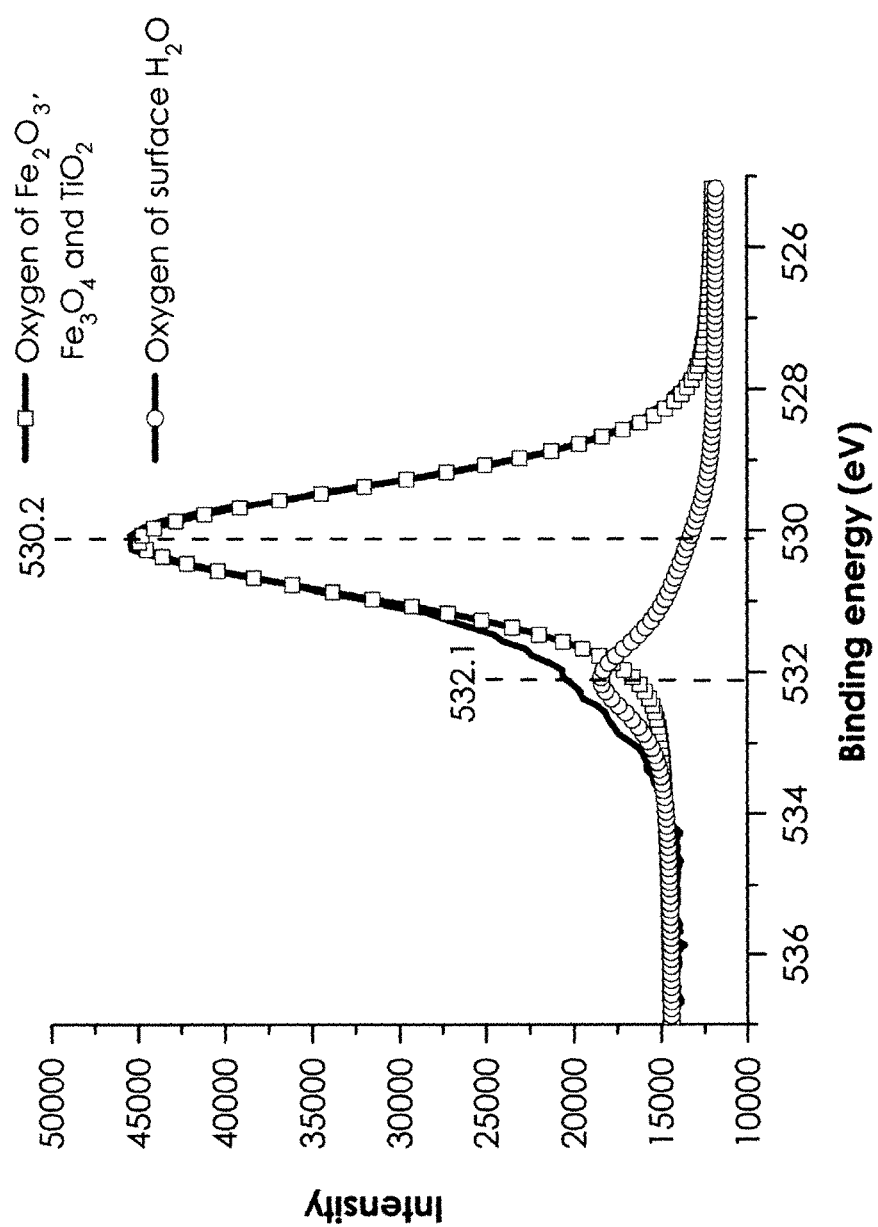
Figure 4F:
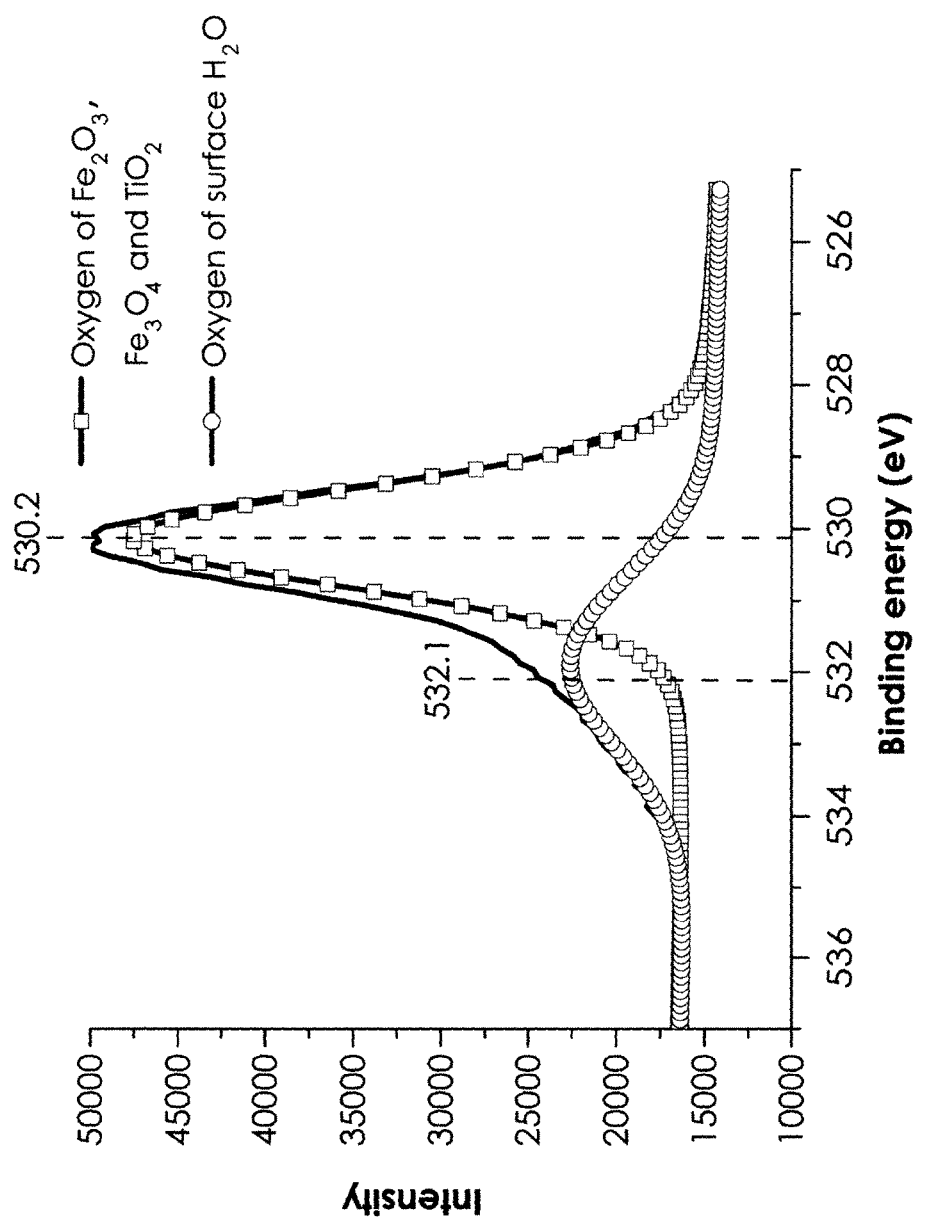
Figure 4G:
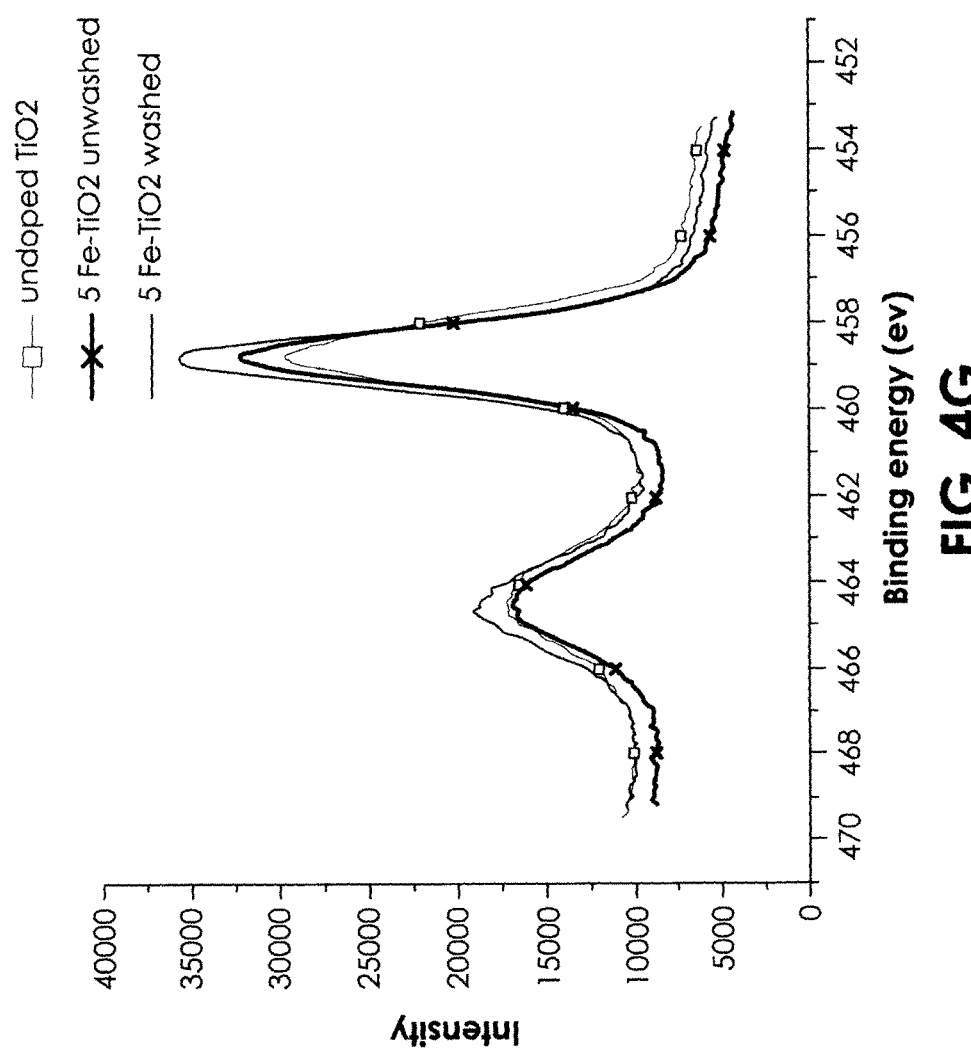

FIG. 4A-G show X-ray photoelectron spectroscopy (XPS) spectra. FIG. 4A is an XPS survey spectra of unwashed Fe10-doped $TiO_2$; FIG. 4B is XPS survey spectra of acid washed Fe10-doped $TiO_2$; FIG. 4C is a high resolution XPS spectra of Fe 2p in unwashed Fe5-$TiO_2$; FIG. 4D is a high resolution XPS spectra of Fe 2p in acid washed Fe5-$TiO_2$; FIG. 4E is a high resolution XPS spectra of O 1 s in unwashed Fe5-$TiO_2$; FIG. 4F is a high resolution XPS spectra of O 1 s in acid washed Fe5-$TiO_2$; and FIG. 4G is a high resolution XPS spectra of undoped $TiO_2$ and unwashed and acid washed Fe5-$TiO_2$.

Figure 5:
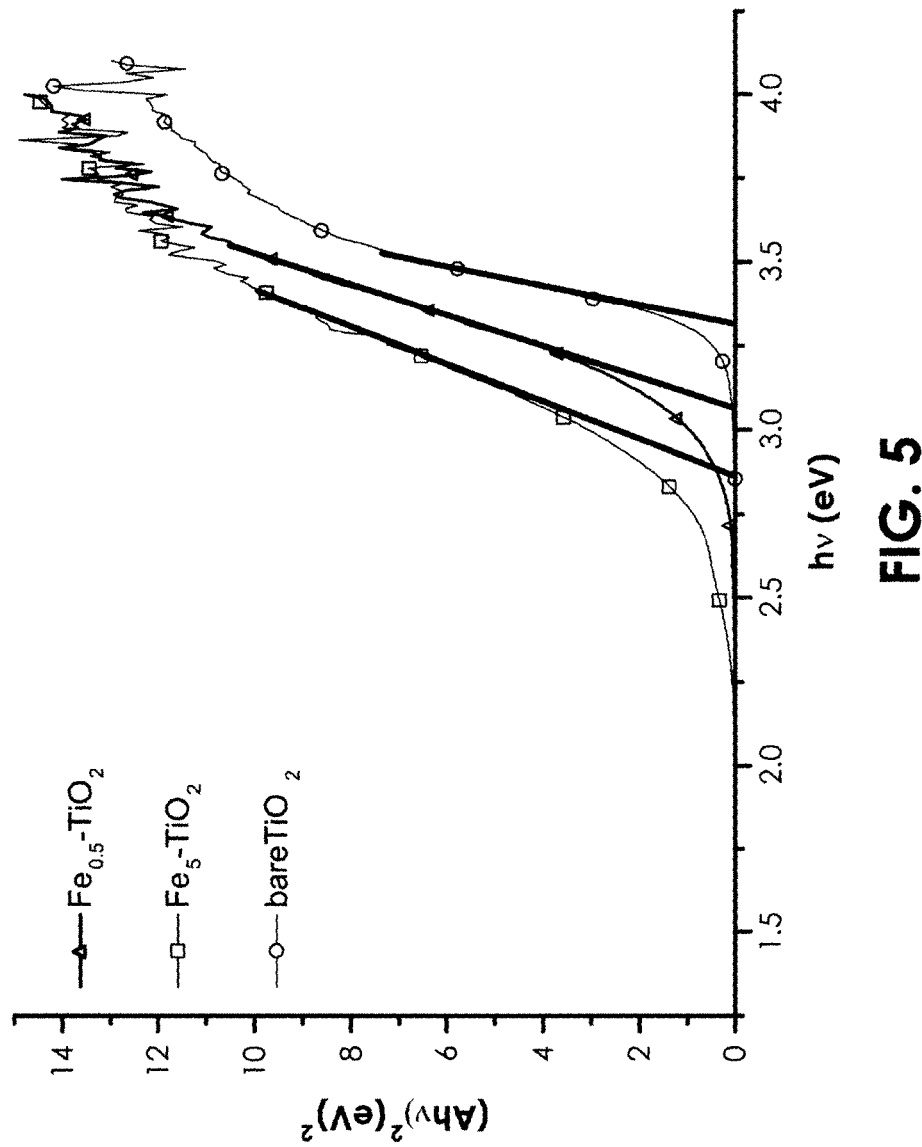

FIG. 5 shows a Tauc plot of titanium dioxide and acid-washed iron doped titanium dioxide with different ratios of dopant (0.5, 5.0 molar %).

Figure 6:
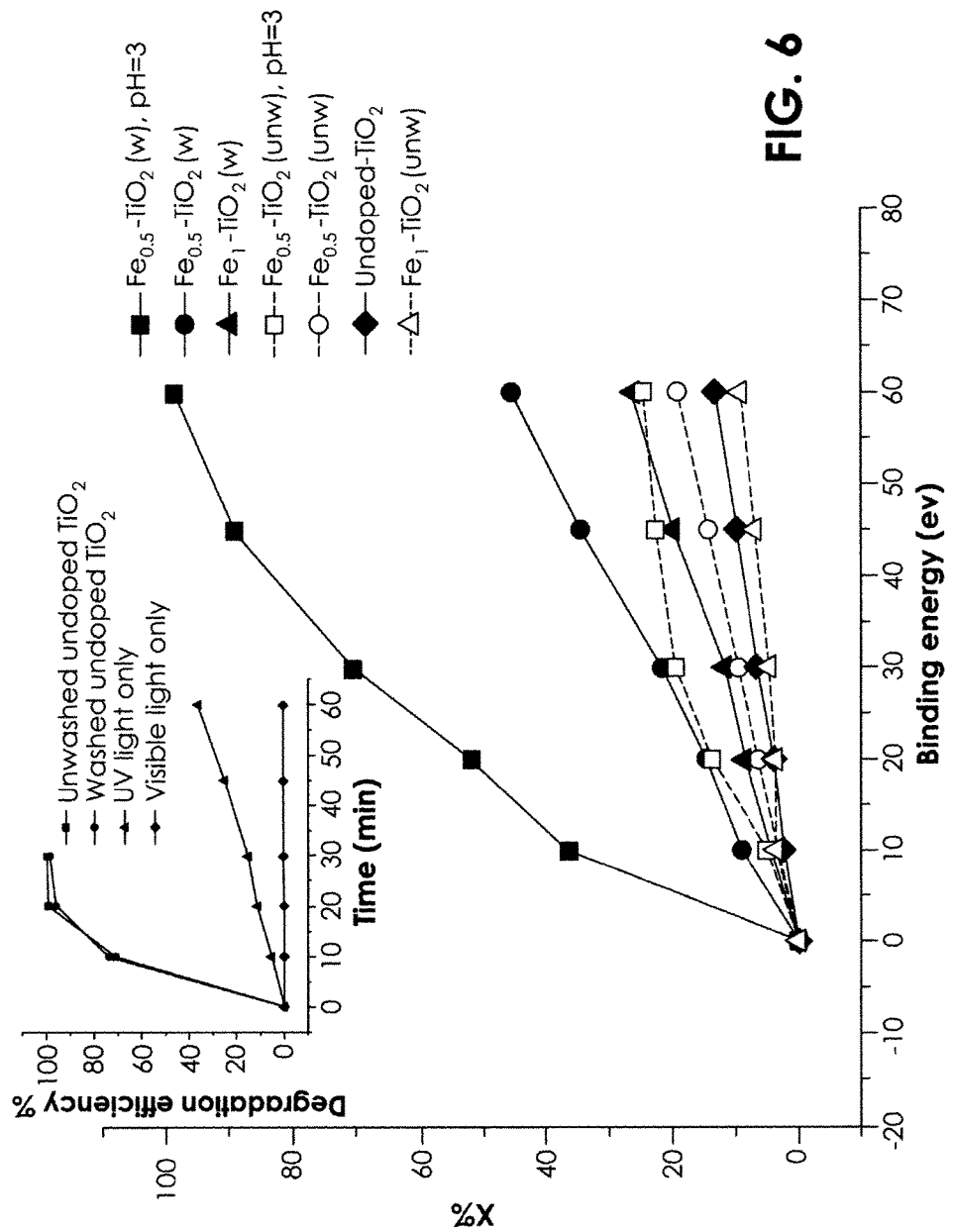

FIG. 6 shows the photocatalytic activity of doped $TiO_2$ with different ratio of dopant (0.25, 0.5 and 1 molar %), synthesized in natural pH and acidic pH (pH=3), unwashed and washed in HCl solution, under visible light illumination within 1 hour of reaction time. The inset depicts the performance of the undoped sample before and after washing. Both were illuminated with UV light illumination for 1 hour of reaction time. Degradation by UV light alone and by visible light alone are also shown.

Figure 7:
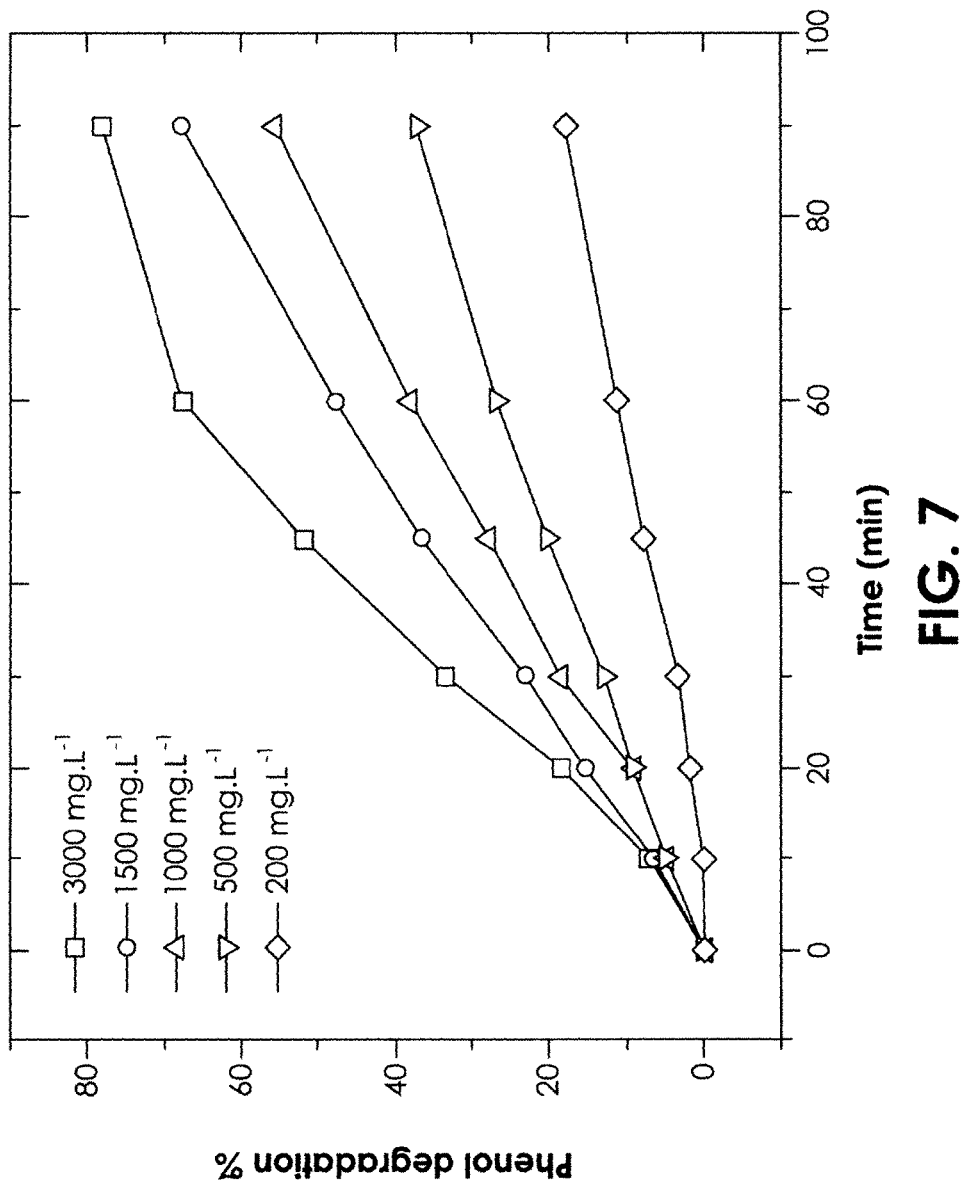

FIG. 7 shows the concentration dependence of degradation efficiency of stable phenols by acid washed iron-doped titanium dioxide.

Figure 8:
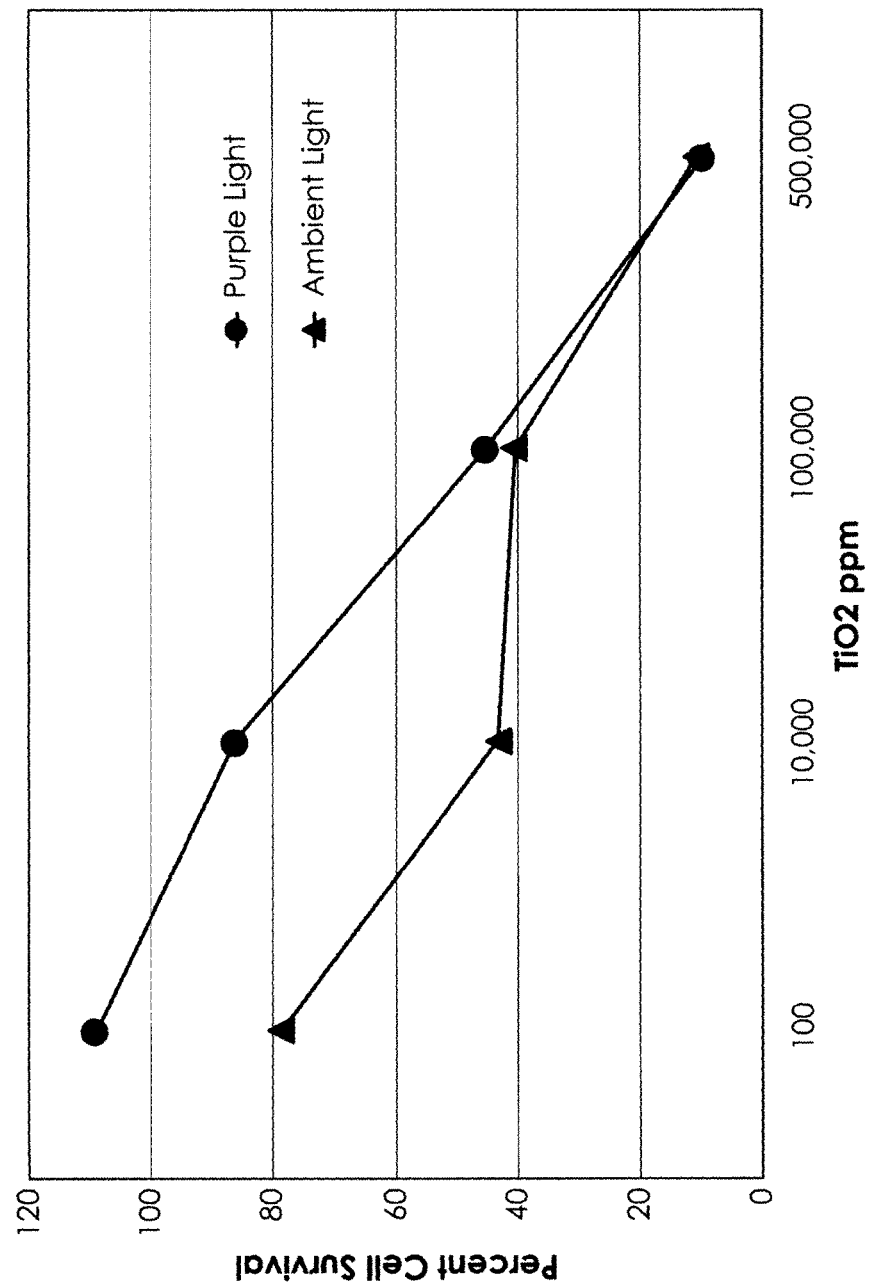

FIG. 8 shows the percent survival of *Escherichia coli* (*E. coli*) cultured in acid washed iron-doped titanium dioxide nanocrystals under a fluorescent light source and under a purple light source.

Figure 9:
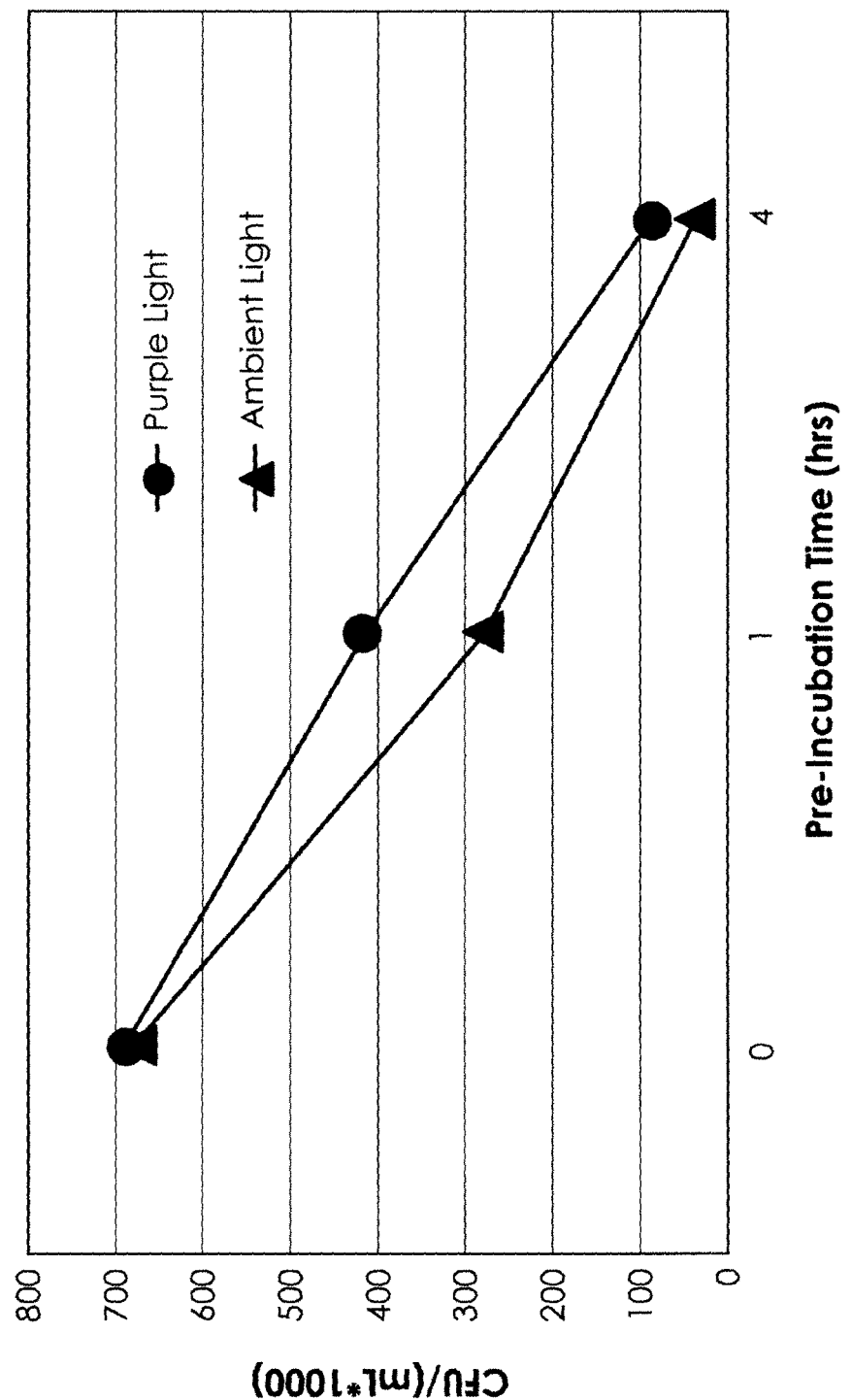

FIG. 9 shows the number of colony forming units of *E. coli* cultured in 100,000 ppm acid washed iron-doped titanium dioxide nanocrystals over four hours.

DESCRIPTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions:

Layer—in the context of the present technology, a layer is a partial coating, a deposit upon a surface, a complete coating or a plurality of layers. To be clear, gaps may occur where the surface below is exposed.

Substantially—in the context of the present technology, substantially, and more specifically, substantially iron oxide free, means that a significant amount of the iron oxide is removed, leaving a negligible amount as measured using the experimental methods of the present technology.

DETAILED DESCRIPTION

Experimental Method

The catalysts were prepared by the sol-gel method using titanium isopropoxide (TTIP) as the precursor and ferric nitrate ($Fe(NO_3)_3 \cdot 9H_2O$) as the iron source. Firstly, the desired amount of ferric nitrate (0.25, 0.5, 1, 5 and 10 molar %) was dissolved in water and then the solution was added to 30 mL of anhydrous ethyl alcohol and stirred for 10 minutes. The acidity of the solution was adjusted to about pH 3 (about pH 2.5 to about pH 3.5) using nitric acid ($HNO_3$) (other acids could also be used), which produces better Fe doped $TiO_2$, i.e., incorporation of Fe into the $TiO_2$ nanocrystals. Secondly, TTIP was added dropwise to the solution. Then deionized water with the ratio of $Ti:H_2O$ (1:4) was added to the mixture. The solution was stirred for two hours and then dried at 80° C. for two hours.

The powders were then washed three times with deionized water. Next, the powder was calcined at 400° C. for three hours. To compare the influence of acid washing on the photocatalytic performance of the calcined powder, a portion of it was stirred in an HCl solution (acid washed) and then washed with deionized water three times. The acid washing was in a solution of about pH 2.5 to about pH 3.5, or about pH 4, with, preferably, a monoprotic acid, such as, for example, but not limited to acetic acid ($CH_3CO_2H$ or HOAc), hydrochloric acid (HCl), hydroiodic acid (HI), hydrobromic acid (HBr), perchloric acid ($HClO_4$), nitric acid ($HNO_3$) or sulfuric acid ($H_2SO_4$), with HCl being the preferred.

Experimental Results

Figure 1B:
Figure 1D:
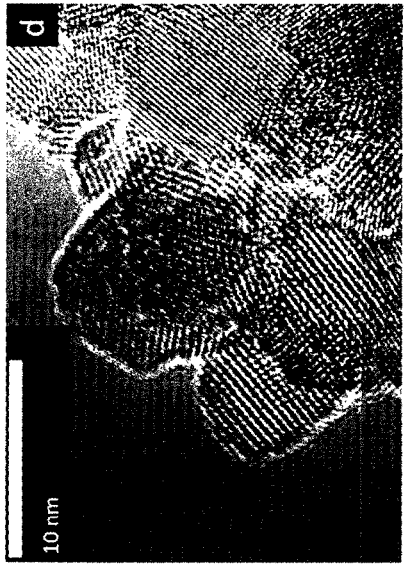
Figure 1A:
Figure 1C:
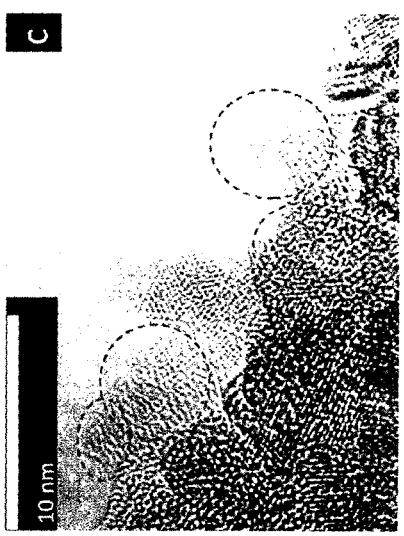

FIGS. 1A-D show the Transmission Electron Microscopy (TEM) images of Fe0.5-$TiO_2$ synthesized at a pH of 3. The synthesis may be done at a pH between about 2.5 and about 3.5. As was obtained from the XRD patterns of the particles, the average particle size of 10 nm can be seen from the TEM images having a uniform size distribution. An amorphous deposit can be observed around the unwashed Fe0.5-$TiO_2$ particles (FIG. 1A), which after acid washing (FIG. 1B) is mostly removed from the particles' surface. This amorphous deposit is more obvious in the High Resolution (HR)-TEM micrographs (FIGS. 1C and 1D). For the majority of particles, the HR-TEM showed an amorphous deposit (defined by the dashed lines) around the unwashed particles (FIG. 1C), whereas, for the acid washed samples (FIG. 1D), the amorphous deposit was mostly removed and the crystal planes were extended until the end of the particles' edges. It should be mentioned that the amorphous phase was also observed for some of the acid washed samples too, but compared to the unwashed samples it was negligible. The composition of the (Fe10-$TiO_2$) particles was studied using electron energy loss spectroscopy (EELS) mapping, which showed that the thin deposit on the surface of the particles is composed of Fe and O.

Figure 2:
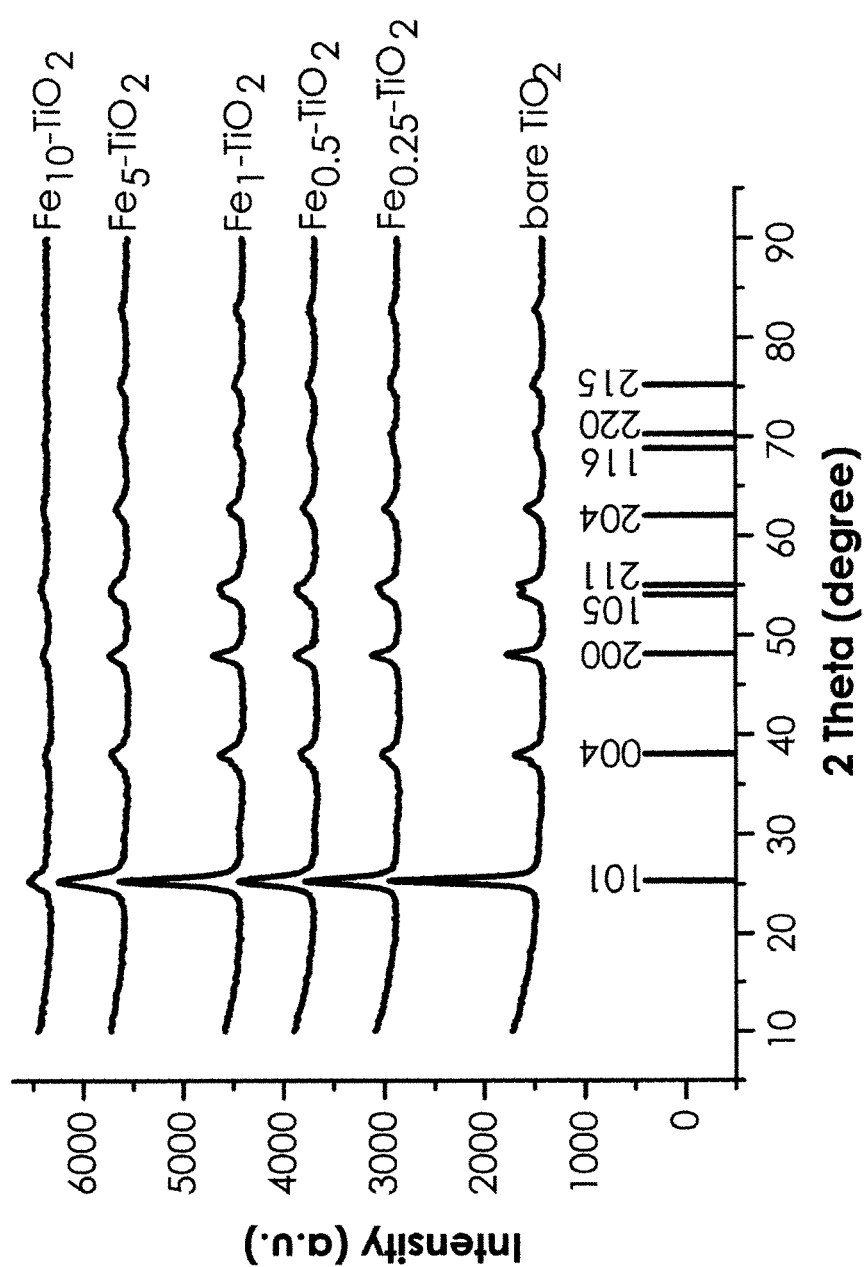
FIG. 2 shows the X-ray diffraction (XRD) pattern of the samples, acid washed (w) and unwashed (unw), calcined at 400° C. for 3 hours for undoped $TiO_2$ and $TiO_2$ doped with different iron content (0.25%, 0.5% and 10% molar ratio). From top to bottom, Fe10-$TiO_2$ w, Fe10-$TiO_2$ uw, Fe0.25-$TiO_2$ w, Fe0.25-$TiO_2$ uw, Fe0.5-$TiO_2$ w, and Fe0.5-$TiO_2$ uw.

FIG. 2 shows the X-ray diffraction (XRD) patterns of undoped $TiO_2$ and Fe-doped $TiO_2$ (with different iron content). The peak at 35.96 2θ degrees corresponds to the main anatase peak. The peak for $\alpha$-Fe2O3 was not observed in any of the spectra suggesting that either iron oxide is formed as an amorphous phase or it may exist as a very thin deposit on the surface of the catalyst particles insufficient for diffraction by the x-rays. The average crystallite size of the particles was determined from the broadening of the XRD peaks applying the Scherrer equation (Rao, Y.; Antalek, B.; Minter, J.; Mourey, T.; Blanton, T.; Slater, G.; Slater, L.; Fornalik, J., Organic Solvent-Dispersed $TiO_2$ Nanoparticle Characterization. Langmuir 2009, 25, 12713-12720). The average crystallite size decreased from 13.31 nm for the undoped sample to 5.09 nm for the Fe10-$TiO_2$ sample. The crystallinity of the $TiO_2$ particles was found to decrease by the increase in the iron content of the samples. Washing the samples with the acidic solution made no change on the crystallinity and also on the particle size of the particles.

Figure 3:
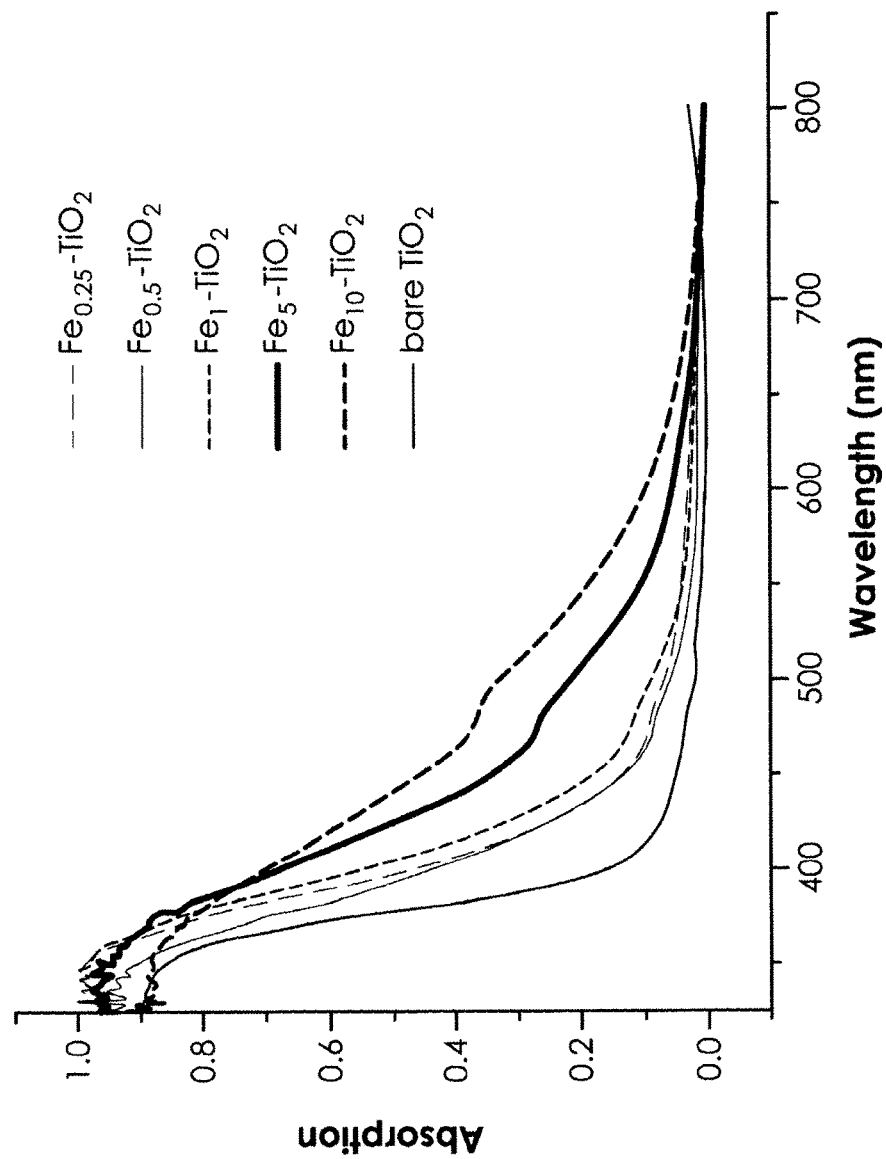
FIG. 3 shows UV-visible diffuse reflectance spectra for undoped $TiO_2$ and Fe-doped $TiO_2$ with different iron content (0.25%, 0.5% and 10% molar ratio).

The optical properties of the undoped and doped $TiO_2$ using UV and visible diffuse reflectance spectroscopy are shown in FIG. 3. The undoped sample did not show any absorption within visible light wavelengths, whereas, the Fe doped $TiO_2$ significantly increased its visible light absorption. The catalyst with the highest iron content showed the highest light absorption within the visible region. It is attributed to the interaction of the 3d orbital of Ti and d orbital of iron, which introduces the intra-band gap state, leading to a red shift in the absorption of light. As the ratio of iron is increased, the absorption edge significantly increased between 400-650 nm. The band gap energy decreased from 3.2 eV for the undoped $TiO_2$ to 2.6 eV for Fe10-$TiO_2$.

X-ray photoelectron spectroscopy (XPS) was used to analyze the chemical composition of the particles, as shown in FIGS. 4A-G. X-ray photoelectron spectroscopy (XPS) is very sensitive to the composition of surfaces. XPS was used to analyze the chemical composition of the particles. It can be seen from the survey scan of Fe10-$TiO_2$ (shown in FIG. 4A and FIG. 4B) that there is no trace of chlorine remaining on the surface after washing the catalyst with HCl, following by washing the samples with deionized water. The survey scans clearly showed before and after the acid washing with HCl solution that the atomic % of surface iron is significantly decreased after washing the catalyst particles with HCl solution indicated by the circles in FIG. 4A and FIG. 4B. The survey scans from Fe10-$TiO_2$, Fe5-$TiO_2$ and Fe1-$TiO_2$ showed 8.5%, 5% and 1.4% atomic ratio of iron to titanium, which are fairly close to the dopant's molar ratios used to synthesize the catalyst. After acid washing, the atomic % of iron decreased to half for all of the samples. The doped iron in the crystal lattice of the doped catalyst is not affected by acid washing; hence, it can be concluded that the decrease in the iron content is related to the iron oxide layers formed on the surface of the catalyst during the synthesis step. This layer was dissolved after the particles were stirred and washed in the HCl acidic solution confirming the results obtained from the EELS mapping spectra. FIGS. 4C and 4D depict the spectra for Fe 2p of Fe5-$TiO_2$ for both unwashed (FIG. 4C) and washed (FIG. 4D) samples. The Fe 2p3/2 of the unwashed sample peaks are located at 709.26, 710.64, 711.8, 713.71 eV; meanwhile, the peak for Fe 2p1/2 appeared around 725.08 eV. Considering the common variations of the binding energies, these peaks are in a very good agreement with the ones observed for $Fe_3O_4$ in previous studies (Grosvenor, A. P.; Kobe, B. A.; Biesinger, M. C.; McIntyre, N. S., Investigation of multiplet splitting of Fe 2p XPS spectra and bonding in iron compounds. Surface and Interface Analysis 2004, 36, 1564-1574; Wang, G.; Ling, Y.; Wheeler, D. A.; George, K. E. N.; Horsley, K.; Heske, C.; Zhang, J. Z.; Li, Y., Facile Synthesis of Highly Photoactive α-Fe2O3-Based Films for Water Oxidation. Nano Letters 2011, 11, 3503-3509.). The O 1 s signal of the doped and undoped samples (FIGS. 4E and F) indicates a peaks at 530.2 eV, which is attributed to Fe2O3 (530.0 Moulder, J. F. S., W. F.; Sobol, P. E.; Bomben, K. D. Handbook of X-ray Photoelectron Spectroscopy. In Physical Electronics Division, Perkin-Elmer Corporation: Eden rairie, Minn., 1992; Fujii, T.; de Groot, F. M. F.; Sawatzky, G. A.; Voogt, F. C.; Hibma, T.; Okada, K., \textit{In situ} XPS analysis of various iron oxide films grown by ${\mathrm{NO}}_{2}$-assisted molecular-beam epitaxy. Physical Review B 1999, 59, 3195-3202) and 529.9 eV (Mills, P.; Sullivan, J. L., A study of the core level electrons in iron and its three oxides by means of X-ray photoelectron spectroscopy. Journal of Physics D: Applied Physics 1983, 16, 723.) and $Fe_3O_4$ (530.3 eV (Mills, P.; Sullivan, J. L., A study of the core level electrons in iron and its three oxides by means of X-ray photoelectron spectroscopy. Journal of Physics D: Applied Physics 1983, 16, 723.). Moreover, another peak at 532.1 eV for O 1 s is observable and according to reports, it can be assigned to the oxygen of the surface $H_2O$. FIG. 4G illustrates the high resolution scan of Ti 2p for Fe5-$TiO_2$ and the undoped $TiO_2$. Two peaks can be seen around 458.7 and 464.3 eV, which are attributed to the Ti 2p3/2 and Ti 2p1/2, respectively.

FIG. 5 shows a Tauc plot of titanium dioxide and acid-washed iron doped titanium dioxide with different ratios of dopant (0.5, 5.0 molar %). The Tauc plot gives the bandgap at the point where the fitted line to the data intersects the horizontal axis. Fe doping of the acid-washed iron doped titanium dioxide reduces the bandgap. A reduced bandgap can absorb longer wavelength of light. Iron is used instead of other metals because iron separates the photon-induced charge carriers due to having the three charge states, $Fe^{+3}$, $Fe^{+2}$ and $Fe^{+4}$.

FIG. 6 illustrates the photocatalytic activity of the catalyst measured using a 100 mL volume of a 20 mgL-1 solution of methyl orange as the representative pollutant. The effect of iron doped content, synthesis pH, and acid washing on the photocatalytic activity were studied as the influential parameters. To study the effect of synthesis pH, Fe0.5-$TiO_2$ sample was synthesized in both natural and acidic pH (pH=3). The catalysts synthesized in the acidic condition showed a higher removal efficiency of methyl orange of 24% compared to the catalyst particles prepared in natural pH with removal efficiency of 18%. Washing Fe0.5-$TiO_2$ with HCl solution enhanced the removal efficiency significantly from 24% up to 98%. According to the results obtained by EELS imaging profile and XPS spectra, washing the samples in HCl solution removes the iron oxide deposits from the catalyst's surface. Without being bound to theory, this may be because there are more accessible reactive sites on the surface leading to a significant enhancement in photocatalytic activity. Moreover, as explained previously, the iron oxide deposit might act as a recombination center for the photogenerated electrons and holes, which decreases the performance of the catalyst particles; thus, removing this deposit increases the lifetime of the charge carriers, which is favorable to the degradation process. In addition, as it can be seen from the inset, washing the undoped catalyst with the acidic solution did not enhance the removal efficiency under UV light illumination, indicating that the improvement in photocatalytic activity of washed samples was due to the removal of the iron oxide deposit from the surface. The photocatalytic performance of undoped $TiO_2$ under visible light illumination (a 300 W xenon lamp with a 400 nm cutoff filter was used to ensure that there was no UV light) was higher than unwashed samples with the iron content of 1, 5 and 10% molar ratio. Without being bound to theory, this may result from the high concentration of dopant contaminating the surface of the catalyst and increasing the electron/hole recombination. Hence, the removal efficiency of these samples is even less than the undoped sample. However, when the samples were washed with the acidic solution, they showed the significant increase compared to the undoped $TiO_2$. There was 100% degradation within 60 minutes.

Example 1

Acid washed iron-doped titanium dioxide was used to react with water to produce water ion radicals. These water ion radicals then reacted with organics to ultimately produce $CO_2$ gas and with ammonia to produce $NO_2$ and $NO_3$ nitrates. The nitrates were removed to produce fertilizer to produce our food. The $CO_2$ was captured and reacted with a catalyst at high temperature (~600 degrees) to produce methane from which all other organic molecules can be produced enabling another complete cycle. The preferred acid was HCl.

Example 2

The acid washed, Fe-doped titanium dioxide was used to treat stable phenols. As shown in FIG. 7, a concentration of 3000 mg/L of acid washed iron-doped titanium dioxide degraded approximately 80% of the stable phenol in 90 minutes.

Example 3

The acid washed iron-doped titanium dioxide was used to clean municipal waste water. Total Organic Content (TOC) in waste water primary effluent was reduced by 50%. TOC in secondary effluent was reduced by 100%.

Example 4

The acid washed iron-doped titanium dioxide was used to clean municipal waste water. Ammonia content in waste water secondary effluent was reduced by 73%.

Example 5

The acid washed iron-doped titanium dioxide nanocrystals were attached to the surface of glass during their synthesis. The glass easily transmitted visible light to the catalyst. Water in the glass that was contaminated with carbon-based compounds and ammonia was decontaminated.

Example 6

Acid washed iron-doped titanium dioxide nanocrystals were effective in reducing microbial growth. As shown in FIGS. 8 and 9, growth of *E. coli*, a gram-negative bacterium, was significantly inhibited. Both purple light and ambient light from a fluorescent light source were used. Percent survival dropped from about 89% for purple light at 100 ppm acid washed iron-doped titanium dioxide to about 18% at 100,000 ppm acid washed iron-doped titanium dioxide. The results for visible light were superior, showing percent survival of about 40% at 100 ppm acid washed iron-doped titanium dioxide to about 9% at 100,000 ppm acid washed iron-doped titanium dioxide. At 500,000 ppm acid washed iron-doped titanium dioxide both purple and ambient light (white light) led to about 10% survival in a separate experiment. As shown in FIG. 9, treatment time for the reduction in growth was relatively short, with the number of colony forming units per mL dropping from 700,000 at time zero to about 90,000 for purple light and about 40,000 for white light at 4 hours. For white light, this represents a 94% reduction.

Example 7

Acid washed iron-doped titanium dioxide nanocrystals were effective in reducing growth of *Staphylococcus epidermidis*, a gram-positive bacterium. It was observed that the gram-positive (*Staph epi*) cells sustained greater reduction in numbers than the gram-negative (*E. coli*) cells when exposed to 1000 ppm of iron-doped titanium dioxide nanocrystals for 24 hours. The reduction was estimated to be about 100 times more than for the *E. coli*.

Example 8

Acid washed iron-doped titanium dioxide will be used to treat water contaminated with one or more of polychlorinated biphenyls (PCBs), fire retardants, estrogen, testosterone, and ibuprofen. Carbon dioxide will be produced.

Example 9

The acid washed iron-doped titanium nanocrystals were dusted on to walls and other surfaces. This created an invisible coating or layer. About 1 gram per 20 cm×20 cm area was used. Water was used to wash the surface and the catalyst reacted with the water and organic contaminants and cleaned the surface.

Example 10

The acid washed iron-doped titanium dioxide was added to squash court paint at a concentration of about 5% to about 20%. Squash balls leave dark scuff marks on the walls which light cannot penetrate through, or penetrates poorly through. It was found that the ability of the acid washed iron-doped titanium dioxide to clean the scuff marks was greatly increased when the paint also included between about 10% to about 20% titanium dioxide. Without being bound to theory, it was assumed that the refractive index of the titanium dioxide allowed the ambient light to be reflected within the paint, thereby reflecting light onto the nanocrystals underneath the scuff marks. The scuff marks were easily removed with soap and water, or a damp cloth, as the humidity within the court was high immediately after athletes had finished playing.

Example 11

The acid washed iron-doped titanium dioxide nanocrystals were prepared on the glass tubes of a photoreactor. The photoreactor was designed for a much larger volume of effluent than would be cleaned using a UV photoreactor (the UV light must be close to the effluent as it does not penetrate far into the effluent, especially if there are particulates or solids in the effluent, hence the tubes are small (1 mm diameter) or the effluent flow, if flowing over the UV light source, is shallow (1 mm deep)). The tubes were about 1 cm in diameter. Visible light was shone on the tubes. The effluent, which contained organic matter and organic compounds, was cleaned as it flowed through the photoreactor as demonstrated in Examples 3 and 4.

Example 12

The acid washed iron-doped titanium dioxide nanocrystals were prepared on a glass substrate of a photoreactor. The photoreactor was designed for effluent to flow over the glass substrate at a depth of up to about 1 cm. Visible light was shone on the effluent. The effluent, which contained organic matter and organic compounds was cleaned as it flowed over the glass substrate.

Example 13

The acid washed iron-doped titanium dioxide nanocrystals will be mixed with at least one organometallic compound in an aqueous solution. The metal will dissociate from the organic moiety and will be recovered as a metal oxide.

Example 14

The acid washed iron-doped titanium dioxide nanocrystals were prepared on a glass substrate of a photoreactor. The nanocrystals grow on the glass and remain attached to the glass. Visible light was shone on the effluent, which contained at least one organometallic compound. The effluent was cleaned as it flowed over the glass substrate. The effluent had a depth of up to about 1 cm.

Example 15

The acid washed iron-doped titanium dioxide nanocrystals were immobilized on a polyacrylonitrile substrate of a photoreactor using an adhesive. Effluent was exposed to the acid washed iron-doped titanium dioxide nanocrystals and the effluent was cleaned.

Example 16

The acid washed iron-doped titanium dioxide nanocrystals were immobilized on aluminum using an adhesive. Aluminum reflects wavelengths of light that activate the nanoparticles. The nanoparticles will be immobilized on aluminum that coats at least a portion of the inside of waste water drainage pipes. A light source is provided inside the pipes, which is preferably a Light Emitting Diode (LED) light source. As the waste water passes through the pipe it will be cleaned. This will have applications in the oil industry, more specifically in plants that extract oil from tar sands. The hot waste water will be cooled by the aluminum and the organic contaminants removed.

Example 17

The acid washed iron-doped titanium dioxide nanocrystals were immobilized on aluminum using an adhesive. The nanoparticles will be immobilized on aluminum that coats at least a portion of the inside of waste water holding tanks, or effluent treatment ponds, or other containment structures for effluent or waste water. A light source is provided inside the containment structure as needed. The light source is preferably a Light Emitting Diode (LED) light source. As the waste water is held in the containment structure it will be cleaned.

Example 18

The acid washed iron-doped titanium dioxide nanocrystals were immobilized on gold using an adhesive. When light is shone on the nanocrystals and gold, the gold functions as a surface plasmon, increasing the amount of light reaching the nanocrystals.

Conclusion

In this work, thin deposit of iron oxide was revealed on the surface of the Fe-doped titanium dioxide catalysts. This deposit formed during their synthesis and was removed by washing the particles in an HCl solvent. Removing this contaminating deposit significantly improved the degradation efficiency from 23% to 98%. Acid washing the undoped $TiO_2$ catalysts did not affect their photocatalytic activity confirming the reason for the substantial enhancement was the removal of the iron oxide deposit.

While the technology has been described in detail, such a description is to be considered as exemplary and not restrictive in character, and is to be understood that it is the presently preferred embodiments of the present technology and is thus representative of the subject matter which is broadly contemplated by the present technology, and that all changes and modifications that come within the spirit of the disclosure are desired to be protected.

The invention claimed is:

1. A method of synthesizing a visible light photo-catalyst, the method comprising doping a titanium dioxide nanocrystal with iron to provide an iron-doped titanium dioxide nanocrystal, drying the iron-doped titanium dioxide nanocrystal to provide a dried iron-doped titanium dioxide nanocrystal, washing the dried iron-doped titanium dioxide nanocrystal with an acid having a pH of no higher than about 4 to produce an acid-washed iron-doped titanium dioxide nanocrystal and rinsing the acid-washed iron-doped titanium dioxide nanocrystal to remove a residual of the acid, thereby providing the visible light photo-catalyst.

2. The method of claim 1, wherein the rinsing is a water rinse.

3. The method of claim 2, wherein the acid has a pH of about 2.5 to about 3.5.

4. A visible light photo-catalyst for remediation of aqueous solutions comprising one or more of organic matter, at least one microbe, at least one organic compound and at least one organometallic compound, the visible light photo-catalyst synthesized by the method of claim 1.

5. A method of remediating an aqueous solution, the aqueous solution including one or more of at least one organic compound, ammonia, organic matter, microbial contamination or at least one organometallic compound, the method comprising: exposing the aqueous solution to a photo-catalyst, the photo-catalyst comprising substantially iron oxide free, iron doped titanium dioxide; and exposing the photo-catalyst to light, thereby remediating the aqueous solution and producing an at least one remediation product.

6. The method of claim 5, wherein the light is visible light.

7. The method of claim 6, wherein exposing comprises mixing the photo-catalyst in the aqueous solution.

8. The method of claim 6, wherein exposing comprises flowing the aqueous solution over the photo-catalyst which is immobilized.

9. The method of claim 8, wherein exposing comprises flowing the aqueous solution through a tube in which the photo-catalyst is immobilized.

10. The method of claim 6, wherein exposing comprises retaining the aqueous solution in a containment structure upon which the photo-catalyst is immobilized.

11. The method of claim 6, wherein the aqueous solution includes the microbial contamination, and remediating reduces or eliminates microbial growth.

12. The method of claim 11, wherein the microbial contamination is a gram-positive or a gram-negative bacterial contamination.

13. A combination for use in remediation of aqueous solutions, the combination comprising: a visible light photo-catalyst, the photo-catalyst comprising acid washed iron-doped titanium dioxide which has a reduced content of iron oxide; and a substrate, the photo-catalyst attached to the substrate.

14. The combination of claim 13, wherein the substrate is glass.

15. The combination of claim 14, wherein the glass is a glass tube.

16. The combination of claim 15, further comprising a light source positioned to irradiate the photo-catalyst.

17. The combination of claim 13, wherein the substrate is aluminum.

18. The combination of claim 17, wherein the aluminum at least partially coats an inner surface of a waste water pipe.

19. The combination of claim 13, wherein the substrate is an inner surface of a containment structure.

20. The combination of claim 13 further comprising paint.

* * * * *